Jan. 12, 1960
C. G. PFEIFFER
2,920,415
HOLDERS FOR FISHING TACKLE
Filed Dec. 13, 1954
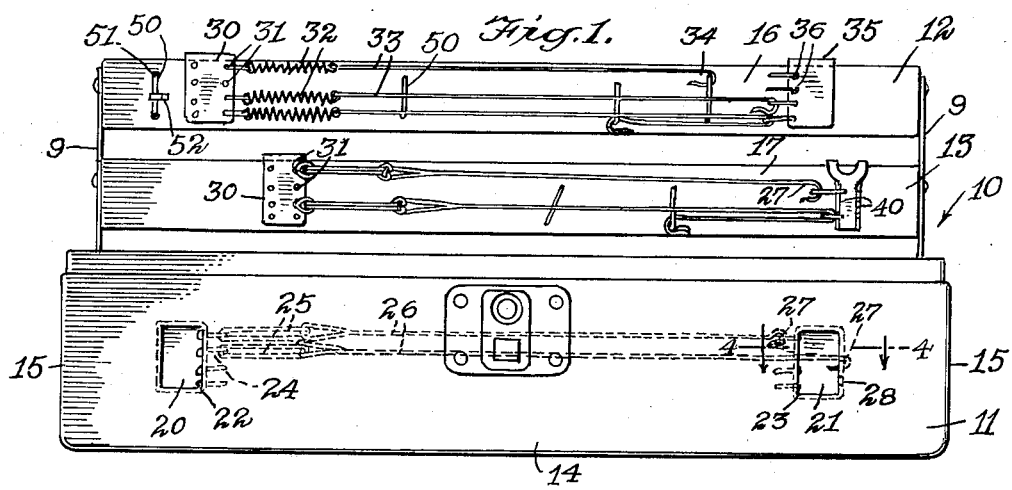
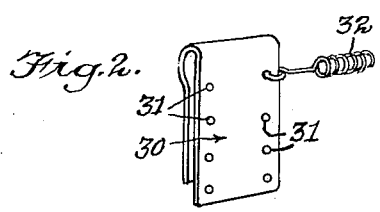
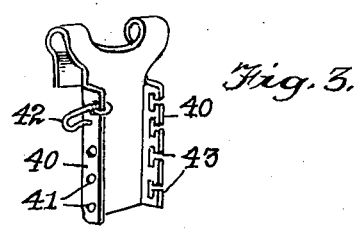
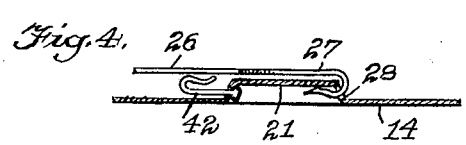
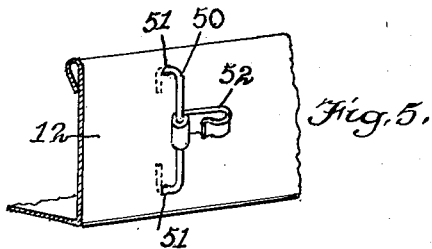
INVENTOR
Carl G. Pfeiffer
BY
Munn, Liddy, Nathanson & March
ATTORNEYS

United States Patent Office 2,920,415
Patented Jan. 12, 1960

2,920,415
HOLDERS FOR FISHING TACKLE

Carl G. Pfeiffer, Peekskill, N.Y.

Application December 13, 1954, Serial No. 474,688

1 Claim. (Cl. 43—57.5)

This invention relates to a new and useful improvement in holders for fishing tackle.

Heretofore great difficulty has been encountered in carrying fishing tackle in a receptacle along with other items which are a necessary part of the fisherman's equipment. The fishing tackle, and more especially the fish hook itself, would become entangled with other fish hooks and with other equipment whereby attempts to remove the same oftentimes resulted in injury to the user and at the least was a very time-consuming and laborious process. In order to overcome this problem, various devices have been proposed for carrying fishing tackle in a container. These devices did not prove satisfactory in so far as a great deal of room was taken up by the device within the container itself and in so far as the respective devices proposed were cumbersome and difficult to handle.

It is an object of the present invention to provide means for holding fishing tackle within convenient reach of the user thereof.

It is a further object of the present invention to provide means for holding fishing tackle which enables the fishing tackle to be carried neatly and compactly within the container carrying the rest of the fishing equipment.

Still a further object of the present invention is to provide means for holding fishing tackle by which each fish hook and its line may be carried separate from other fish hooks and their lines.

Still another object of the present invention is to provide means for holding fishing tackle having all the desired advantages, which is nevertheless inexpensive to manufacture and easy to produce.

Other objects and advantages are set forth in greater detail in the accompanying specification taken in conjunction with the accompanying drawings, in which:

Fig. 1 is a front view of a fishing tackle box showing the fishing tackle holders of the present invention;

Fig. 2 is a perspective view of one form of the fishing tackle holder of the present invention;

Fig. 3 is a perspective view of a modified form of the fishing tackle holder of the present invention;

Fig. 4 is a section taken along the lines 4—4 of Fig. 1; and

Fig. 5 is a perspective partially broken view showing an elongate member and hook construction of the present invention.

Referring to the drawings, there is shown a cantilever fishing tackle kit or container 10 consisting of a body portion 11, and automatic rising trays 12 and 13 which rise and drop under the action of levers 9. The trays 12 and 13 are adapted to nest in the body portion 11 when the container is closed. While the invention is described in connection with a cantilever kit 10, it is to be noted that this type of container is shown for illustration purposes and that any type of container for fishing tackle may be utilized according to the present invention.

According to the present invention, as shown in Fig. 1, I have provided recessed portions 20 and 21 spaced from each other in the front portion 14 of the container as shown. The recessed portions 20 and 21 are provided with openings 22 and 23. These openings 22 are engaged by one of the ends of holders 24 which are connected at their other ends to one end of extensible elongate members 25 which are shown in the form of rubber bands. The other ends of the extensible elongate members are secured to one of the ends of the fish hook leaders 26. The other ends of the fish hook leaders are provided, in the usual manner, with snelled fish hooks 27. The hook portions of the snelled fish hooks 27 pass through and are engaged in the apertures 23 in the inwardly offset portion 21. If desired, the recessed portion may be provided with a slot 28, as shown, which is another way of engaging the hook portions of the snelled fish hooks 27.

I have thus presented according to the present invention, a structure wherein a normally unused portion of the fishing tackle container; viz., the sides, front and/or rear panels are utilized for carrying the fish hooks in a neat, compact, separated manner without consuming any substantial portion of the area within the container itself and leaving the bottom and top portions of the container free for other necessary uses.

Also shown in Fig. 1 are various types of clips usable in place of the recessed portions hereinbefore discussed but not integral with the container itself. If desired, the normally unused side front and/or rear panels of the box or the front panels of the tray may be equipped with these holders in the form of clips by the fisherman so that these various panels heretofore having no function except as walls, can be utilized for compactly, efficiently and safely carrying snelled fish hooks.

As shown in Figs. 1 and 2, the clip 30 comprises a strip of material which may be of metal, plastic or any other suitable material, bent over upon itself and provided with openings 31 along its edges adapted to carry the elongate extensible members 32 shown here in the form of springs. To these members is secured one of the ends of the fish hook leaders 33, the other ends of which carry the snelled fish hooks 34. Spaced apart from the clip 30 is another clip 35 having openings 36 adapted to engage the hooked portions of the snelled fish hook holders 34. The fishing tackle is thus carried under tension and can be properly attached in position or removed simply by exerting pressure on the extensible elongate member to enable easy attachment or removal of the fishing tackle therefrom.

As shown in Figs. 1 and 3, a clip comprising the holding member consists of a strip of material which also may be of metal, plastic or any other suitable material partially bent over upon itself and provided with flanges 40 along each of its side edges. The flanges may be provided with apertures 41 adapted to carry a hook 42 to engage the hook portion of the snelled fish hook 27. If desired, the flange may be provided with notches 43 in which the snelled fish hook may be attached. The clip shown in Figs. 1 and 3 may, of course, be attached to any side or front portion of the base of the container and in the front or rear portion of the trays.

As shown in Figs. 1 and 5, an anchor member may comprise an elongate piece of material 50 bent over both ends and secured within apertures 51 to the front or sides of the container or the front or rear of the tray. The thin elongate piece of material 50 may be of metal, plastic, or any other suitable material. I have provided intermediate the thin elongate piece of material a hook 52 adapted to engage either the elongate extensible member or the snelled fish hook at the desire of the user.

With this invention only a previously non-used portion of the fishing tackle container is used to provide a fishing tackle carrier in a compact, separate and neat manner.

Variations and modifications may be made without departing from the spirit of the invention or the scope of the appended claim.

I claim:

A receptacle for fishing tackle having a tray therein provided with an open top and planar walls, a pair of U-shaped clips of resilient sheet material having portions extending in face-to-face relation adapted to be placed on opposite faces of the upper portion of a planar wall to frictionally engage the same, said clip portions having apertures adjacent opposite parallel sides, an elastic member adapted to be engaged in one of said apertures whereby a snelled fish hook may have the hook portion thereof engaged in an aperture in one of said clips and the looped portion of the snell engaged by the elastic member engaged in an aperture in the second of the pair, the clips being spaced along the planar wall so as to place tension upon the elastic member and the snell in order to support the same thereon in substantially a horizontal straight line position.

References Cited in the file of this patent

UNITED STATES PATENTS

| | | |
|---|---|---|
| 639,454 | Smith | Dec. 19, 1899 |
| 969,402 | Petty | Sept. 6, 1910 |
| 689,667 | Blakeslee | Dec. 24, 1901 |
| 1,133,542 | Deal | Mar. 30, 1915 |
| 1,483,255 | Tonge | Feb. 12, 1924 |
| 1,737,450 | Burch et al. | Nov. 26, 1929 |
| 1,790,498 | Dewey | Jan. 27, 1931 |
| 1,791,346 | Burch et al. | Feb. 3, 1931 |
| 1,858,539 | Dewey | May 17, 1932 |
| 1,910,484 | Thompson | May 23, 1933 |
| 2,144,300 | Styker | Jan. 17, 1939 |
| 2,190,647 | Buicke | Feb. 20, 1940 |
| 2,229,292 | Heiner | Jan. 21, 1941 |
| 2,448,728 | Omohundro | Sept. 7, 1948 |